Nov. 3, 1942.  O. J. VOSS  2,301,100
OIL GROOVING MACHINE
Filed June 24, 1940  3 Sheets-Sheet 1
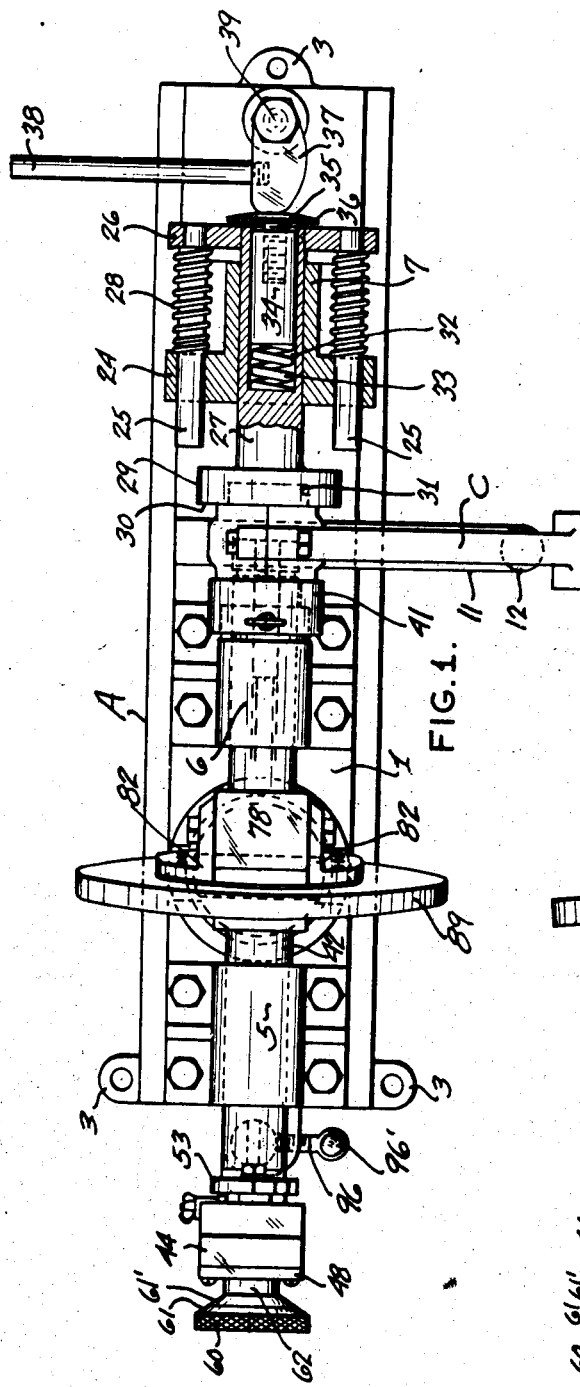
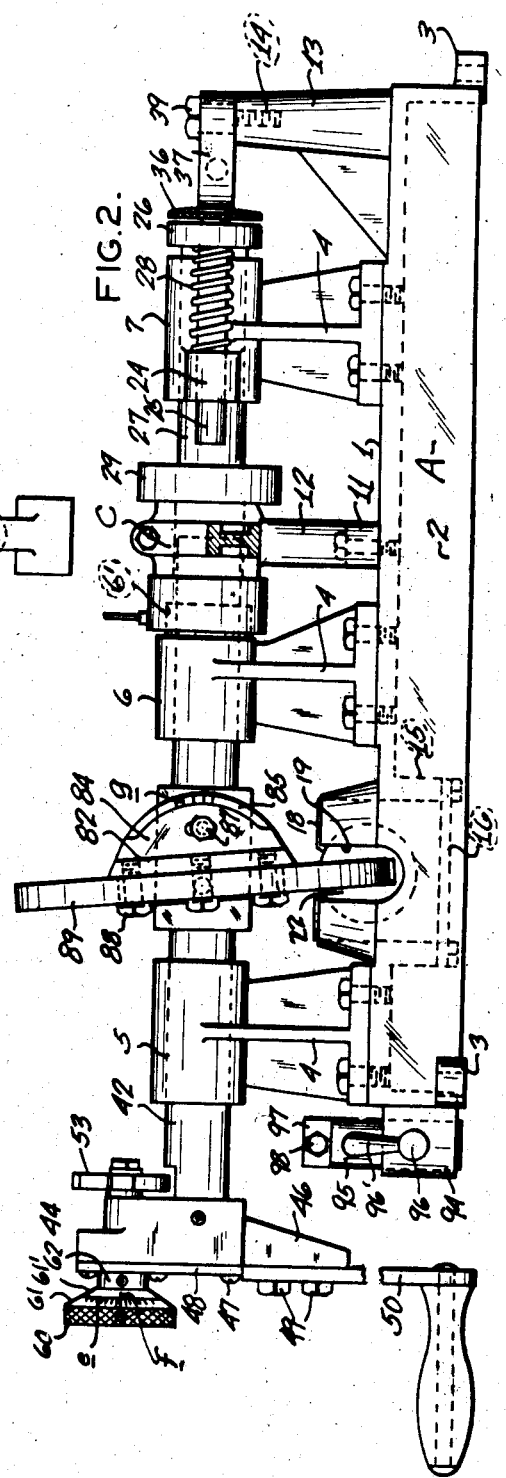
INVENTOR.
OTTO J. VOSS
BY
ATTORNEY.

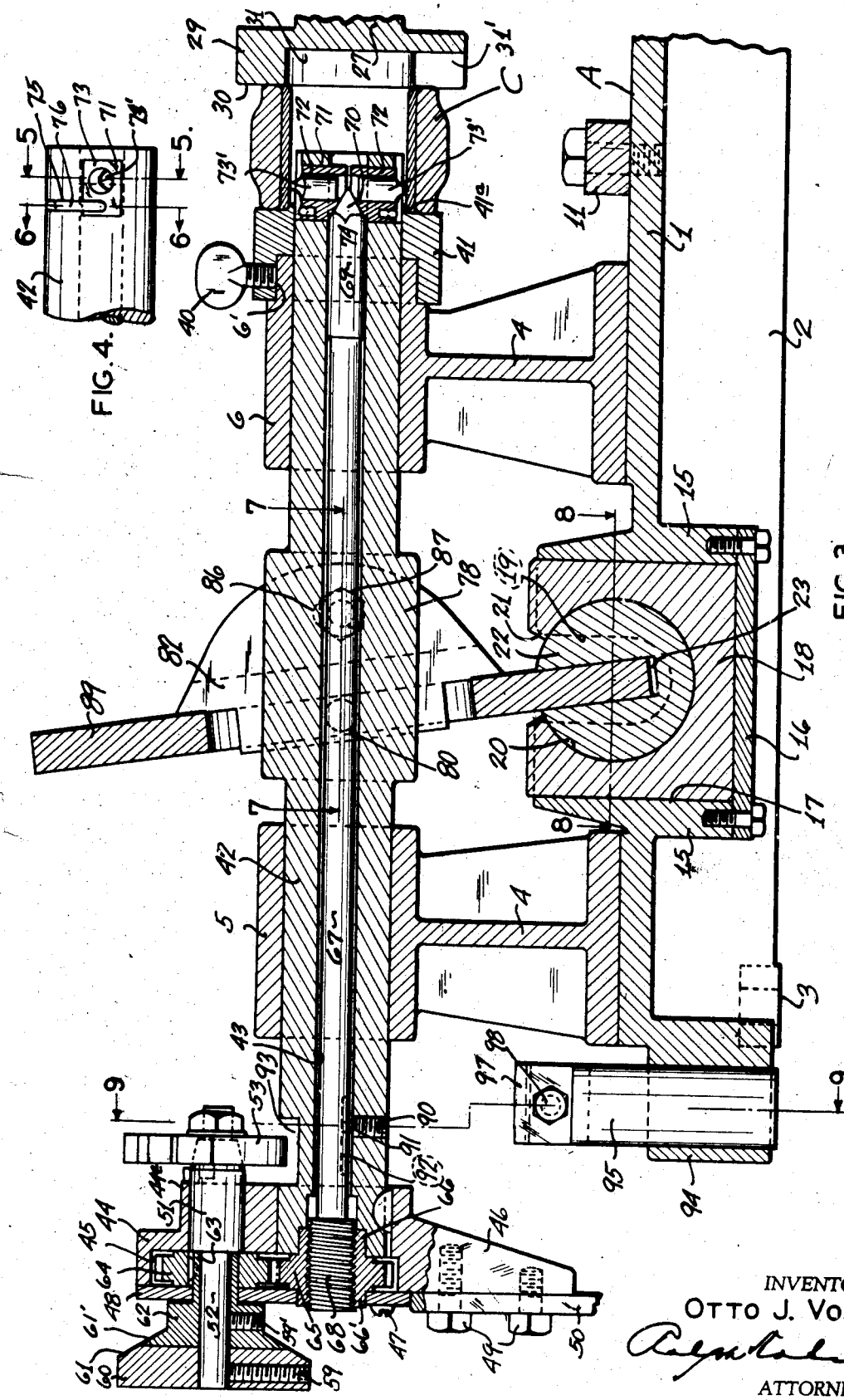

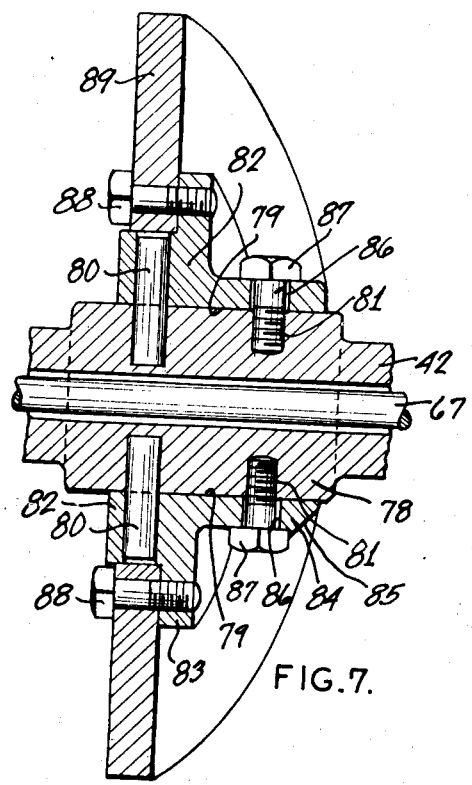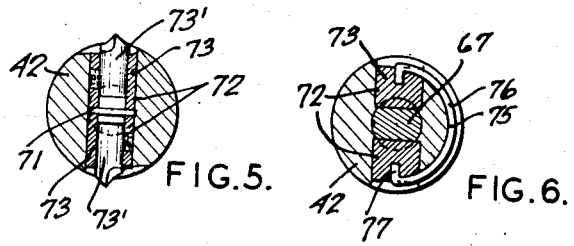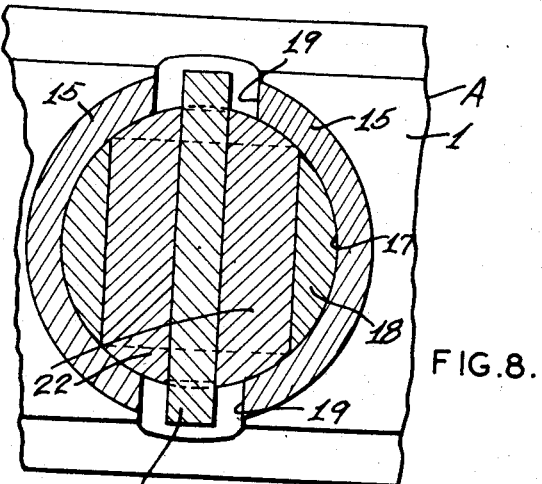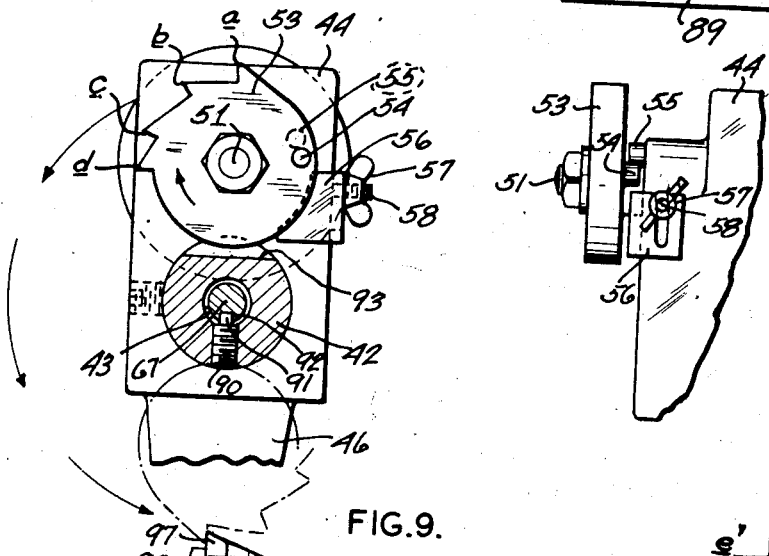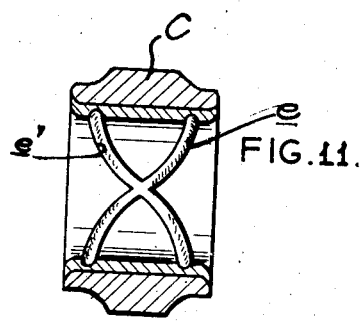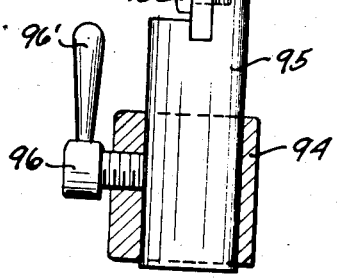

Patented Nov. 3, 1942

2,301,100

UNITED STATES PATENT OFFICE 2,301,100

OIL GROOVING MACHINE

Otto J. Voss, Normandy, Mo., assignor to H & H Machine and Motor Parts Co., St. Louis, Mo., a corporation of Missouri Application June 24, 1940, Serial No. 342,139

12 Claims. (Cl. 82—19)

This invention relates generally to grooving machines and, more particularly, to a certain new and useful improvement in machines for automatically oil-grooving automotive and other machine bearings.

My invention has for its primary objects the provision of a machine for the purpose stated which is uniquely capable of oil-grooving connecting rod and other bearings of various sizes, which may be easily and precisely adjusted for forming oil grooves of different dimensions, shapes, and depths, and which, when set and adjusted for the cutting of an oil groove of a particularly selected size, shape, and depth, will repeatedly operate with extreme accuracy in the formation of oil grooves of the desired or selected dimensions and contour.

My invention has for a further object the provision of a machine of the type and for the purpose stated which may be readily constructed, which is economical in operation and maintenance, and which is rapid, convenient, and facile in operation.

And with the above and other objects in view, my invention resides in the novel features of form, construction, arrangement, and combination of parts presently described and pointed out in the claims.

In the accompanying drawings (3 sheets)—

Figure 1 is a top plan view of an oil-grooving machine constructed in accordance with and embodying my present invention;

Figure 2 is a side elevational view of the machine;

Figure 3 is an enlarged fragmentary longitudinal sectional view of the machine;

Figure 4 is a fragmentary top plan view of the cutting tool of the machine;

Figures 5 and 6 are transverse sectional views of the cutting tool, taken approximately along the lines 5—5 and 6—6, respectively, Figure 4;

Figures 7, 8, and 9 are detail sectional views of the machine, taken approximately along the lines 7—7, 8—8, and 9—9, respectively, Figure 3;

Figure 10 is a fragmentary side elevational view of the cutting tool feed mechanism of the machine; and Figure 11 illustrates in transverse section a vehicular bearing equipped with crossed oil-grooves automatically generated or produced by my present machine.

Referring now in more detail and by reference characters to the drawings, which illustrate a preferred embodiment of the invention, the machine includes a suitably elongated rigid base A comprising a horizontally disposed bed-plate 1 adapted for attachment by means of a marginal flange 2 having a plurality of suitably apertured feet 3 upon a work-bench, table, or other support.

Bolted or otherwise suitably fixed upon the upwardly presented face of the base plate 1, are pedestals or standards 4 supporting longitudinally aligned and suitably spaced rear, intermediate, and forward annular bearings 5, 6, and 7, respectively, the latter having a diametrally reduced forwardly presented extension 6'.

Also bolted or otherwise suitably fixed at an end-portion upon the upper face of the bed-plate 1 intermediate the bearings 6, 7, is a laterally presented horizontally disposed work-supporting arm 11 provided at its outer end with an upwardly projecting pedestal or work-rest 12.

Formed centrally of the bed-plate 1 in forwardly spaced relation to the bearing 7, is a post 13, opening upon the upper face of which is a vertically bored threaded recess 14.

Intermediate the rear and intermediate bearing-standards 4, the bed-plate 1 is centrally interrupted by an opening flanked by vertically disposed webs 15. Fixed to and upon the webs 15 at their lower end, is a horizontally disposed plate 16. Thus the bed 1 is conveniently provided with a so-called housing, as at 17, for snugly accommodating a cylindrical swivel-block 18. The housing 17 is provided along its upwardly presented opposite margins with a pair of transversely juxtaposed so-called U-shaped clearance recesses 19, and the swivel-block 18, in turn, is provided with a horizontally extending cylindrical bore 20 axially cut-away along an upper segment of its surface in the provision of a slot 21 opening upon and extending diametrally across the upper face of the swivel-block 18. Rotatably mounted in the bore 20, is a cylindrical cradle-bar 22 provided with an inwardly radially extending axial slot 23, the bar 22 at its opposite ends being ground off to a spherical surface having the same radius as the outer surface of the swivel-block 18, all as best seen in Figures 3 and 8 and for purposes presently fully appearing.

Formed preferably integrally with, and projecting radially outwardly from, the forward bearing 7, is a pair of diametrally opposed bosses or lugs 24 bored for shiftably accommodating a pair of horizontally disposed parallel rods 25 fixed at their forward end in a cross-plate 26, in turn, centrally apertured for tightly embracing the forward end of a work-holding plunger 27 shiftably mounted in and projecting rearwardly through the bearing 7.

Abuttingly interposed on the rods 25 between the lugs 24 and plate 26, are suitable compression springs 28 for normally yieldingly urging the plate 26 and associated work-holding plunger 17 forwardly with respect to the fixed base A.

At its rearward end, the work-holding plunger 27 is provided with a diametrically enlarged head 29 axially recessed or relieved upon its rearward or work-abutting face 30 in the provision of a clearance-recess 31 formed in its annular side wall with a radial slot, as at 31', for permitting cutting-oil and chips to pass freely out of the bearing-bore during groove-cutting operations.

At its forward end, the work-holding plunger 27 is provided with an axial recess 32 for accommodating a relatively heavy compression spring 33 and a shiftable take-up plunger 34 provided with a forwardly extending axial stud 35 having at its outer or forward end a transversely disposed endplate 36 for engagement with a locking-cam 37 having a manipulating handle 38 and pivotally secured upon the post 13 by means of a stud 39 seated in the recess 14.

Removably held on the bearing-extension 6' by means of a radial set-screw 40 in rearwardly spaced axial alignment with the work-holding plunger 27, is a chuck 41 provided with a forwardly projecting annular work-positioning shoulder 41ᵃ contoured to fit snugly within the arcuately rounded-off end-face of the particular bearing-bore. As will presently be more fully discussed, the particular chuck 41 is preferably one of a set of interchangeable like chucks having work-positioning shoulders 41ᵃ respectively sized for engaging work-pieces of various sizes.

Journaled in and extending horizontally through the bearings 5, 6, is a main tubular shaft 42 having a concentric or axial bore 43, and fixed upon and extending diametrally across the rear end of the shaft 42, is a housing 44 having a rearwardly opening chamber 45 and a downwardly presented bracket-arm 46. Secured, as by means of suitable fastening-members 47, upon the housing 44 in closurewise disposition over the open side of the chamber 45, is an end-plate 48, and fixed by means of bolts 49 to the arm 46, is a radially extending crank or handle 50.

Forming part of the housing 44 and having a bore communicating with the chamber 45, is a hub-extension 44ᵉ, journaled in which is a counter-shaft 51 provided with a diametrally reduced rearwardly projecting shank 52. Suitably fixed on the forwardly projecting end of the shaft 51, is a feed-actuating or so-called ratchet-wheel 53 having along a portion or segment of its periphery four equally spaced ratchet-teeth a, b, c, d, and provided upon its rearwardly presented face with a horizontally disposed pin 54 for selective engagement with a fixed stop 55 set into the forward face of the housing 44 or with an adjustable stop-member 56 shiftably held by means of a wing-nut 57 or the like upon a threaded stud 58 set into an adjacent face of the housing 44.

Adjustably secured, as by means of a set-screw 59 or the like upon the rearward end of the counter-shaft shank 52, is an indexing knob 60 having a forwardly presented beveled face 61 provided with a scale e comprising a series of spaced graduations indicatively marked in successive order with the numerals "0," "10," "20," "30," "40."

Also adjustably secured, as by means of a set-screw 59', upon the shank 52 in sidewise abutment against the forward face of the knob 60, is a feed-controlled knob 62 having a beveled face 61' forming a complementary continuation of the graduated knob face 61 and provided, as at f, with a single reference graduation or index marking.

Formed preferably integrally with, and extending axially forwardly from, the knob 62, is a hub 63 projecting freely through the housing wall 48 and keyed upon which within the housing-member 45, is a pinion 64 sized for meshing engagement with an internally threaded gear nut 65 formed, in turn, with forwardly and rearwardly extending hub portions 66, 66', for journaled engagement, respectively, in the housing 44 and its wall 48, all as best seen in Figure 3 and for purposes presently fully appearing.

Mounted for lengthwise shiftable movement in the bore 43 of the shaft 42, is a tool-feeding rod 67 provided at its rear end with a diametrally enlarged lead-screw barrel 68 threadedly engaged in the gear-nut 65. At its forward end, the rod 67 is preferably integrally provided with a diametrally enlarged guide barrel 69 sized for snug-fitting shiftable engagement in the shaft-bore 43 and provided with a forwardly presented conical tip 70 projecting into a diametrally extending rectangular tool-accommodating slot 71 formed transversely in the end of the shaft 42 for shiftably seating a pair of oppositely presented cutters 72, the latter including blocks 73 adjustably provided with renewable cutting tools 73' and having rearwardly presented oblique inner faces 74 for wedgewise sliding engagement with the guide-barrel tip or point 70. In this connection, it should be noted that the longitudinal axis of the tool-holding slot 71 is aligned with the longitudinal axis of the housing 44 and is accordingly disposed in the same plane as the longitudinal axis of the counter-shaft 51.

Adjacent its forward end, the shaft 42 is provided with a segmental groove 75 opening at its opposite ends into the slot 71 for seating a semi-circular slip-spring 76 bent radially inwardly at its opposite ends in the provision of hooks 77 releasably engageable in the tool-holding blocks 73 for yieldingly retaining the latter in engagement with the guide-barrel tip or point 70, all as best seen in Figures 3, 5, and 6. In this connection, it should be noted that the particular set of cutters 72 is one of a plurality of interchangeable sets respectively sized for equipping connecting rods with grooves of various sizes.

Intermediate the sleeves 5 and 6, the shaft 42 is provided with a preferably integral enlargement 78 having oppositely presented parallel side faces 79 disposed in planes parallel to the plane of the longitudinal axis of the counter-shaft 51 and provided with axially aligned outwardly projecting pins 80 and oppositely presented and aligned threaded recesses 81.

Mounted for rotary movement on the pins 80, are swivel-blocks 82 having a laterally extending arcuate flange 83 and a forwardly projecting arcuate plate 84, the latter extending on opposite sides outwardly beyond the block 82 and having a forwardly presented beveled face 85 provided, as at g, with a plurality of suitably numbered or otherwise indicated graduations. The swivel-block plates 84 are also provided with registering arcuate slots 86 for slidably embracing lock-bolts 87 threaded into the recesses 81, all as best seen in Figures 3 and 7 and for purposes presently fully appearing.

Centrally apertured for disposition about the shaft enlargement 78 and secured by means of bolts 88 to and upon the rear face of the swivel-block flanges 83, is a relatively large disk-shaped plate 89 concentric with the shaft 42 and disposed for movement marginally in the cradle-slot 23, all as best seen in Figures 3 and 7 and for purposes presently fully appearing.

The shaft 42 is provided adjacent its rear end with a radial set-screw 90 having a reduced shank-extension 91 for motion-limiting engagement in a longitudinal slot 92 formed in the rod 67, and upon its outer peripheral face the shaft 42 is further provided with a segmental groove 93 for clearing the feed-wheel 53, all as best seen in Figure 3.

Formed centrally upon the rear margin of the base-plate 1, is a rearwardly presented extension 94 for shiftably accommodating an upwardly extending post 95, and engaging the post 95 and base-portion 94 for adjustably securing the post 95, is a set-screw 96 having an operating handle 96'. At its upper end, the post 95 is recessed for seating a stop bar 97, the latter being detachably secured to its seat by means of a bolt or the like 98, all as best seen in Figures 3 and 9 and for purposes presently fully appearing.

In initially assembling the machine, the particular tool-bits 73' are adjusted in the respective blocks 73 to a predetermined setting such that, when the blocks 73 are brought into endwise abutting engagement with the bits presented in diametrically opposite directions, the diametral distance between such tool points will be substantially smaller than the fixed or standard diameter of the particular connecting rod-bearing to be grooved in the machine. Prior to the insertion of the particular cutters 72 into the machine, the set-screw 59' is loosened and the knob 62 released for rotation. By then rotatably actuating the knob 62, the center rod 67, through the inter-engagement of the gear 64 and barrel 68, is shifted rearwardly until the point 70 is withdrawn from the tool-holder slot 71. Thereupon, the pre-set cutters 72 are inserted into the slot 71, and their retaining spring 76 set in place. It will, of course, be evident that the spring 76 will yieldingly pull the cutters 72 radially inwardly into endwise abutment and, therefore, the diametral distance between the cutting points of the tools 73' will be less than the diameter of the particular connecting rod bearing for which the tools have been pre-set.

The knob 62 is thereupon suitably rotatably actuated for advancing the center rod 67 and thereby shifting the cutters 72 and associated tools 73' outwardly until, when measured by a conventional micrometer, the distance between the cutting points of the tools is preferably .006 inch smaller than the standard diameter of the particular connecting rod bearing for which the tools have been pre-set.

The knob 60 is thereupon rotated in a counter-clockwise direction, bringing the stop-pin 54 of the ratchet 53 into engagement upon the under side of the primary stop pin 55. The set-screw 59 is thereupon loosened and the knob 60 shifted around until the zero mark of the scale e coincides with the reference mark on the knob 62. Thereupon, the set-screws 59, 59', are tightened, locking both knobs 60, 62, to the shank 52 of the shaft 51 and thereby forming the permanent zero setting or indexing of the machine at which the tool points have a clearance of .006 inch within the particular bearing to be grooved. It will, of course, be obvious in this connection that the amount of clearance is a matter of choice and may, if desired, be varied in intially fixing the zero setting.

Once the machine has been adjusted to its permanent zero setting, the selected cutters 72 are removed and placed in a special micrometer (not shown), which is then calibrated to read directly the standard diameter of the connecting rod bearing which is to be grooved by such selected cutters 72. It will, of course, be evident that this micrometer is thus provided with a zero-setting, which is permanently corrected for all the necessary constants of the particular machine and may thereafter be used to pre-set all the other pairs of interchangeable cutters 72 and also to reset the tools 73' in the holders 73 after sharpening or regrinding. And it may now be stated that the graduations of the scale e on the knob 60 are uniformly so spaced with reference to the pitch of the lead screw portion 68 of the center rod 67 that, when the set-screw 59 is loosened and the knob 62 rotated, so that its index mark or reference line f is shifted into registration with the graduation marked "10" of the scale e, the center rod 67 will be shifted rearwardly a short distance and the tool-holders 73 and associated tools 73' drawn inwardly to decrease the diametral distance between the cutting points .010 inch under the standard diameter for which the particular tools 73' have been pre-set. Similarly, by shifting the knob 62 so as to bring the index mark f thereof in line with the other respective graduations of the knob 60, the tool points may be set for various under-size diameters to accommodate the various under-sized connecting rod bearings which will be commonly encountered.

In operation, the bolts 87 are loosened, permitting the curve-generating plate 89 and the associated pivot blocks 82 to rotate freely with respect to the shaft 42. The handle 50 is swung down into its lowermost vertical position and the entire shaft 42 manually pulled backwardly toward the bearing 7. The knobs 60, 62, which are now both locked upon the shaft 51, are rotated until the ratchet wheel pin 54 comes into abutment with the fixed stop 55, thus yieldingly drawing the cutters or bits 72 inwardly to so-called zero position, at which they will be set to fit within the standard bearing size for which the particular tool-holders have been pre-set, allowing the previously mentioned clearance of .006 inch. The curve-generating plate 89 is then swung to a selected angle of inclination, as indicated by the scale g on the pivot block flanges 84, to provide the desired amplitude of the curved oil groove to be cut. When adjusted to the correct setting, the bolts 87 are tightened, locking the plate 89 rigidly to the shaft 42.

The head of the particular connecting rod C which is to be grooved is then inserted over the positioning rim or shoulder 41' of the chuck 41 with the shank extending outwardly and resting upon the work-supporting post 12. The connecting rod C is then locked into place by swinging the cam handle 38 forwardly, oscillating the cam 37 about the stud 39 and yieldingly urging the work-holding plunger 27 and the associated cross-plate 26 and guide rods 25 forwardly, compressing the springs 29, and bringing the work-engaging face 30 of the plunger-head 29 abuttingly against the forwardly presented side face of the connecting rod bearing C.

Thereupon, the crank or handle 50 is rotated in a clockwise direction, causing the oblique curve generating plate 89 to slide through the slot 23 of the bar 22. Since the swivel member 18 is only rotatable about its own vertical axis and the swivel bar 22 about its own horizontal axis, the rotation of the oblique plate 89 will shift the shaft 42 forwardly during the first 180° of rotation of the handle 50 and the forward end of the shaft 42 will project slightly into the clearance aperture 31 of the work-holding plunger 27. At that point, the ratchet tooth a will strike against the stop bar 97, as shown in Figure 9, causing the ratchet wheel 53 to rotate in the direction of the arrow, thereby turning the gear knob 65 and advancing the center rod 67 forwardly to shift or feed the cutters 72 outwardly a predetermined distance. This amount of outward shifting movement of the cutters 72 will be substantially greater than the .006 inch clearance, as the rotation of the handle 50 is continued through the second 180°, bringing the same back to its original position, the cutters 72 will be moved along a convolute path resulting from the compound rotary and longitudinally shifting movement imparted to the shaft 42 by the oblique plate 89. The cutters 72 will thus be caused to simultaneously traverse the bore of the bearing C both longitudinally and annularly and thereby cut into the inner peripheral face of the bearing C communicating and crossing or so-called skew-shaped grooves, such as e, e', Figure 11. Thereupon, the second ratchet tooth b will engage the stop bar 97 and the cutters 72 fed outwardly to take a second cut. At subsequent revolutions of the handle 50, the cutters 72 repeat their to and fro movement through the connecting rod bearing, each time being advanced outwardly by the cutter feeding mechanism, as above described, for increasing the depth of the groove until the last ratchet tooth d has been shifted by the stop bar 97. Thereafter no further advance of the cutters can occur no matter how many times the shaft 42 is additionally rotated.

Once the machine is set up or calibrated, it is possible, as above stated, to accommodate a wide range of different connecting rods by supplying different sets of cutters 72 and companion-sized chucks 41. In each case, the cutting tools 73' are placed in the tool-holders or blocks 73 and pre-set, by means of the specially calibrated micrometer, to the standard diameter of the particular size of connecting rod upon which they are to operate. Each pair of pre-set cutters 72 will, upon being placed in the tool-holding slot 71 of the shaft 42, have a clearance of .006 inch under the actual standard diameter for which such cutters have been pre-set when the ratchet pin 54 is rotated into position against the fixed stop 55.

In the course of ordinary practice, it is frequently desirable to groove connecting rod bearings which are either .010, .020, .030, or .040 inch under size. To groove under-size bearings, the set-screw 59' is loosened and the knob 62 rotated until the index line f thereof coincides with the particular graduation of the scale e on the knob 60 corresponding to the under-size measurement of the particular connecting rod bearing. Thereupon, the set-screw 59' is tightened and the machine operated as previously described. This displacement of the knobs 60, 62, with relation to each other draws the cutters inwardly to an initial cutting diameter which is either .016, .026, .036, or .046 inch under the standard diameter, as the case may be.

By reason of the fact that small-sized connecting rods have a thinner shell of anti-friction material than the large-sized connecting rods, such small-sized connecting rods must be provided with a groove of somewhat smaller depth. For this purpose the movable stop 56 may be shifted up to operative position and tightened in place by the wing-screw 57, and a pair of cutters 72 employed which, when placed in the shaft 42, will have a clearance of .006 under the standard diameter of the connecting rod to be grooved. In such case, when the knob 60 and the associated feed-controlling knob 62 are rotated to withdraw the cutters, the ratchet pin 54 will engage the stop member 56, leaving the ratchet tooth b in outwardly presented position for engagement with the stop-bar upon the first rotation of the handle 50. It will thus be evident that the ratchet tooth a does not perform any feeding function and, therefore, there is one less feeding movement of the ratchet 53, producing an oil groove of less depth.

The machine is thus substantially automatic in operation and has been found exceedingly rapid, durable, accurate, precise, and efficient in the performance of its intended functions.

It should be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. A grooving machine including work-holding means, a rotary and longitudinally shiftable tool-shaft, a pair of diametrally projecting cutters on the shaft, means for rotating the shaft, means comprising a flat plate mounted transversely of the shaft, and a swivel-bearing member slidably engaging the plate along its peripheral margin for axially reciprocating the shaft during rotation for effecting one complete groove-cutting stroke during each full rotation of the shaft.

2. A grooving machine including work-holding means, a rotary and longitudinally shiftable tool-shaft, a pair of diametrally projecting cutters on the shaft, means for rotating the shaft, a flat plate mounted for swingable movement transversely of the shaft, means for holding the plate immovable with respect to the shaft at any selected position of adjustment, and swivel-bearing means slidably engaging the plate along its peripheral margin for axially reciprocating the shaft during rotation for effecting one complete groove-cutting stroke during each full rotation of the shaft.

3. A grooving machine including work-holding means, a rotary and longitudinally shiftable tool-shaft, a pair of diametrally projecting cutters on the shaft, means for rotating the shaft, means for axially reciprocating the shaft during rotation for effecting one complete groove-cutting stroke during each full rotation of the shaft, and means for radially advancing the cutters a predetermined amount during each rotation of the shaft.

4. A grooving machine including work-holding means, a rotary and longitudinally shiftable tool-shaft, a pair of diametrally projecting cutters on the shaft, means for rotating the shaft, means for axially reciprocating the shaft during rotation for effecting one complete groove-cutting stroke during each full rotation of the shaft, and means for radially advancing the cutters a predetermined amount during the first three cutting strokes thereof.

5. A grooving machine including work-holding means, a rotary and longitudinally shiftable tool-shaft, a pair of diametrally projecting cutters on the shaft, means for rotating the shaft means for axially reciprocating the shaft during rotation for effecting one complete groove-cutting stroke during each full rotation of the shaft, and means for advancing the cutters a predetermined amount only during a selected number of cutting strokes for limiting the depth of the cut groove.

6. In a groove-cutting machine, a rotary shaft having a diametral slot, a pair of oppositely disposed cutters mounted shiftably in the slot, spring means for normally urging the cutters radially inwardly toward each other, wedge-like means interposed between the cutters for shifting the cutters radially outwardly, and means for actuating said wedge-like means responsive to rotation of the shaft.

7. In a groove-cutting machine, a rotary shaft having a diametral slot, a pair of oppositely disposed cutters mounted shiftably in the slot, spring means for normally urging the cutters radially toward each other, feed means interposed between the cutters for shifting the cutters outwardly, means for actuating the feed means responsive to rotation of the shaft, and means co-operable with the feed means for setting the cutter to a selected one of several preset cutting diameters.

8. In a groove-cutting machine, a rotary shaft having a diametral slot, a pair of oppositely disposed cutting-bits mounted shiftably in the slot, feed means for shifting the bits radially outwardly, means for actuating the feed means responsive to rotation of the shaft, and indexing means for setting the bits for radial movement to a selected cutting diameter.

9. In a groove-cutting machine, a rotary shaft having a diametral slot, a pair of oppositely disposed cutting-bits mounted shiftably in the slot, feed means including a shiftable shaft for actuating the bits radially outwardly, means for concurrently actuating said shafts, and indexing means for co-relating the movement of said shafts for effecting selected radial movement of the bits.

10. In a groove-cutting machine, a rotary tubular shaft having a diametral slot, a pair of oppositely disposed cutting-bits mounted shiftably in said slot, feed means including a shaft longitudinally shiftable in the tubular shaft for actuating the bits radially outwardly, means for concurrently actuating said shafts, and indexing means including co-operable gears for co-relating movement of said shafts for effecting selected radial movement of the bits.

11. In a grooving machine, a rotating reciprocatory quill shaft provided at one end with a plurality of radially extensible cutting tools, a longitudinally shiftable wedge disposed within the shaft and having engagement with the tools for shifting the tools inwardly and outwardly with respect to the shaft, a rod connected at one end to the wedge and extending through the shaft, being provided at its other end with an externally threaded barrel portion, a gear nut mounted on the barrel portion, and means for rotating the gear nut for feeding the cutting tools inwardly and outwardly of the quill shaft.

12. An oil groove forming machine comprising a base, bearing means mounted on the base, a shaft rotatably and shiftably mounted in the bearing means, a swivel bearing mounted on the base including a first cylindrical member mounted for rotation about an axis at right angles to the axis of rotation of the shaft, a second cylindrical member rockably mounted in the first member for rotation about an axis at right angles to the axis of rotation of the first member and provided with a radial slot, and a plate fixed upon the shaft at an oblique angle to the longitudinal axis thereof and being slidably engaged adjacent its periphery within said slot for inducing reciprocatory movement of the shaft when the shaft is rotated.

OTTO J. VOSS.